(12) United States Patent
Howard (10) Patent No.: US 7,730,213 B2
(45) Date of Patent: Jun. 1, 2010

(54) OBJECT-BASED STORAGE DEVICE WITH IMPROVED RELIABILITY AND FAST CRASH RECOVERY

(75) Inventor: John H. Howard, Cambridge, MA (US)

(73) Assignee: Oracle America, Inc., Redwood Shores, CA (US)

( * ) Notice: Subject to any disclaimer, the term of this patent is extended or adjusted under 35 U.S.C. 154(b) by 1910 days.

(21) Appl. No.: 09/739,618

(22) Filed: Dec. 18, 2000

(65) Prior Publication Data

US 2002/0078244 A1 Jun. 20, 2002

(51) Int. Cl.
*G06F 15/16* (2006.01)
*G06F 15/173* (2006.01)
*G06F 15/167* (2006.01)

(52) U.S. Cl. .................. 709/248; 709/242; 709/213; 709/214; 709/216

(58) Field of Classification Search ................. 709/212, 709/248
See application file for complete search history.

(56) References Cited

U.S. PATENT DOCUMENTS

| | | | | |
|---|---|---|---|---|
| 5,475,668 A | * | 12/1995 | Azumatani et al. | 369/47.14 |
| 5,566,331 A | | 10/1996 | Irwin et al. | |
| 5,668,732 A | * | 9/1997 | Khouja et al. | 702/60 |
| 5,701,480 A | * | 12/1997 | Raz | 718/101 |
| 5,724,581 A | * | 3/1998 | Kozakura | 707/202 |
| 5,761,677 A | * | 6/1998 | Senator et al. | 707/203 |
| 5,761,687 A | * | 6/1998 | Hon et al. | 715/531 |

(Continued)

FOREIGN PATENT DOCUMENTS

EP 1 049 029 11/2000

(Continued)

OTHER PUBLICATIONS

R.Baird, S. Karamooz,H.Vazire.,"Distributed Information Storage Architecture,"1051-917393, 1993 IEEE.*

(Continued)

*Primary Examiner*—Rupal D Dharia
*Assistant Examiner*—Thomas Duong
(74) *Attorney, Agent, or Firm*—Lawrence J. Merkel; Meyertons, Hood, Kivlin, Kowert & Goetzel, P.C.

(57) ABSTRACT

An object-based storage may employ a transactional interface and a copy on write protocol. The inode for the file (which is identified by the I-number and indicates one or more blocks storing the file data) may be copied to a working copy of the inode, and the working copy may be updated to indicate the newly allocated blocks. In response to a file commit (e.g. a file close or a file synchronization command), the working copy of the inode may be atomically written to a non-volatile storage. In this manner, the updates performed during the transaction may be atomically committed to the file. The inode itself may be stored in a file (referred to as the inode file), and the storage may perform updates to the inode file atomically as well. The inode file may be modified using the copy on write protocol described above, and the master inode (mapping the blocks of the inode file) may be atomically written to non-volatile storage to atomically update the inode file. In one particular embodiment, the storage employs a journal technique for updates to the inode file.

31 Claims, 8 Drawing Sheets

U.S. PATENT DOCUMENTS

| | | | |
|---|---|---|---|
| 5,828,876 A | | 10/1998 | Fish et al. |
| 5,870,757 A | * | 2/1999 | Fuller .................... 707/201 |
| 5,893,140 A | | 4/1999 | Vahalia et al. |
| 5,915,253 A | | 6/1999 | Christiansen |
| 5,940,594 A | | 8/1999 | Ali et al. |
| 6,012,060 A | | 1/2000 | Loaiza et al. |
| 6,014,660 A | * | 1/2000 | Lim et al. .................... 707/3 |
| 6,021,414 A | * | 2/2000 | Fuller .................... 707/202 |
| 6,065,037 A | * | 5/2000 | Hitz et al. .................... 709/200 |
| 6,075,932 A | * | 6/2000 | Khouja et al. .................... 716/4 |
| 6,128,623 A | | 10/2000 | Mattis et al. |
| 6,144,999 A | * | 11/2000 | Khalidi et al. .................... 709/219 |
| 6,163,856 A | * | 12/2000 | Dion et al. .................... 714/4 |
| 6,188,695 B1 | * | 2/2001 | Przybysz .................... 370/410 |
| 6,219,693 B1 | | 4/2001 | Napolitano et al. |
| 6,269,431 B1 | | 7/2001 | Dunham |
| 6,324,581 B1 | | 11/2001 | Xu et al. |
| 6,339,793 B1 | | 1/2002 | Bostian et al. |
| 6,345,379 B1 | * | 2/2002 | Khouja et al. .................... 716/4 |
| 6,360,330 B1 | | 3/2002 | Mutalik et al. |
| 6,389,420 B1 | | 5/2002 | Vahalia et al. |
| 6,401,120 B1 | * | 6/2002 | Gamache et al. .................... 709/226 |
| 6,405,284 B1 | | 6/2002 | Bridge |
| 6,442,613 B1 | | 8/2002 | Gregg et al. |
| 6,446,188 B1 | * | 9/2002 | Henderson et al. .................... 711/206 |
| 6,453,354 B1 | | 9/2002 | Jiang et al. |
| 6,484,185 B1 | * | 11/2002 | Jain et al. .................... 707/203 |
| 6,493,804 B1 | | 12/2002 | Soltis et al. |
| 6,556,998 B1 | | 4/2003 | Mukherjee et al. |
| 6,567,853 B2 | | 5/2003 | Shomler |
| 6,571,259 B1 | * | 5/2003 | Zheng et al. .................... 707/205 |
| 6,594,676 B1 | * | 7/2003 | Moore .................... 707/202 |
| 6,625,617 B2 | * | 9/2003 | Yarnall et al. .................... 707/104.1 |
| 6,629,189 B1 | | 9/2003 | Sanstrom et al. |
| 6,651,140 B1 | | 11/2003 | Kumar |
| 6,684,229 B1 | * | 1/2004 | Luong et al. .................... 707/204 |
| 6,732,124 B1 | * | 5/2004 | Koseki et al. .................... 707/202 |
| 2002/0112008 A1 | * | 8/2002 | Christenson et al. .................... 709/206 |
| 2002/0161855 A1 | | 10/2002 | Manczak et al. |

FOREIGN PATENT DOCUMENTS

WO 94/29807 12/1994

OTHER PUBLICATIONS

Best, S., "JFS Log. How the Journaled File System Performs Logging," Proceedings of the 4$^{th}$ Annual Linux Showcase and Conference,—Oct. 10, 2000, XP-002231204, 6 pages.

Gray, J. et al., "Transaction Processing: Concepts and Techniques," 1994, Morgan Kaufman Publishers, Inc., XP-002231205, 5 pages.

Srinivasan, B. et al., "Recoverable File System for Microprocessor Systems," Microprocessors and Microsystems, IPC Business Press Ltd. Longd, vol. 9, No. 4, May 1, 1995, XP-002026284, pp. 179-183.

"An Introduction to the Mass Storage System Reference Model, Version 5," Robert A. Boyne, et al., IBM Corp., IEEE, 1993, pp. 47-53.

"Distributed Information Storage Architecture," R. Baird, et al., Hewlett-Packard Corp, IEEE 1993, pp. 145-155.

International Search Report for PCT/US 01/48511, mailed Mar. 4, 2003, 7 pages.

David F. Nagle, et al., "Network Support for Network-Attached Storage," Dept. of Electrical and Computer Engineering, Carnegie Mellon Univ., Proc. Hot Interconnects, Aug. 1999, 6 pages.

Seagate Technology, "Object Based Storage Devices Command Set Proposal," Oct. 25, 1999, 1 page.

Gray et al., *Transaction Processing: Concepts and Techniques*, © 1993 Morgan Kaufmann Publishers, Inc., pp. 5-7.

Gibson et al., "NASD Scalable Storage Systems," Jun. 1999, pp. 1-6.

"VERITAS File System Performance," © 1996 VERITAS Software Corp., pp. 1-41.

"File System Performance," © 1996 VERITAS Software Corp., pp. 1-17.

"File System," © 1996 VERITAS Software Corp., pp. 1-17.

Hitz et al., "File System Design for an NFS File Server Appliance," © 1994 The USENIX Assoc., pp. 1-23.

"Object Based Storage Devices: A Command Set Proposal," Oct. 1999, pp. 1-65.

H. Gobioff, et al., "Security for Network Attached Storage Devices," White Paper CMU-CS-97-185, Oct. 1997.

* cited by examiner

OBJECT-BASED STORAGE DEVICE WITH IMPROVED RELIABILITY AND FAST CRASH RECOVERY

BACKGROUND OF THE INVENTION

1. Field of the Invention

This invention is related to a network of computer systems and, more particularly, to reliable storage in the network and efficient access to the storage by client computer systems.

2. Description of the Related Art

Frequently, computer systems are deployed in a networked environment. In the networked environment, one or more client computer systems running user applications may be connected to one or more file servers which provide networked access to files used by the applications. Such a networked environment is referred to as a distributed file system.

An important feature of distributed file systems is high reliability of the file system. More particularly, it is important that the file system be as immune as possible to any system failures (crashes, power failures, etc.). If a system failure occurs, a less reliable file system may experience file corruption (e.g. if the failure occurred while the file was in the process of being updated). Repairing file corruption may be a complex and time consuming process, and may result in the loss of data. The lost data may result in a subsequent loss of productivity for the user who updated the file, and may even result in permanent loss if the lost data cannot be easily recreated by the user.

SUMMARY OF THE INVENTION

The problems outlined above are in large part solved by a storage in accordance with the present disclosure. The storage may be an object-based storage in which a file ID (e.g. I-number) is provided to the storage with read and write commands and the storage performs the mapping from file ID to storage blocks. The storage may employ a transactional interface in which the various updates to a file performed between the opening of the file and the closing of the file are either committed as a whole to non-volatile storage or abandoned as a group. The storage may employ a copy on write protocol in which a block of a file to be updated is copied to a newly allocated block, and the newly allocated block is updated. The inode for the file (which is identified by the I-number and indicates one or more blocks storing the file data) may be copied to a working copy of the inode, and the working copy may be updated to indicate the newly allocated blocks. In response to a file commit (e.g. a file close or a file synchronization command), the working copy of the inode may be atomically written to a non-volatile storage. In this manner, the updates performed during the transaction may be atomically committed to the file. Since the updates are atomically committed, the likelihood of file corruption in the case of a system failure may be reduced. Thus, reliability of the storage may be increased.

The inode itself may be stored in a file (referred to as the inode file). To further enhance reliability in such cases, the storage may perform updates to the inode file atomically as well. The inode file may be modified using the copy on write protocol described above, and the master inode (mapping the blocks of the inode file) may be atomically written to non-volatile storage to atomically update the inode file. There may be no explicit commit to changes to the inode file, however, since clients do not directly update the inode file. Accordingly, the changes may be committed periodically.

In one particular embodiment, the storage employs a journal technique for updates to the inode file. The journal includes: (i) a checkpoint record which stores the master inode; and (ii) a list of inodes which have been committed since the checkpoint was created. Periodically, a new checkpoint may be created by writing the current working copy of the master inode (after ensuring that the underlying inode file updates have completed). Subsequent inode updates may be committed to the journal in entries subsequent to the checkpoint. In the event of a system failure, the stable inode file indicated by the checkpointed master inode may be recovered, and the committed inodes in the journal subsequent to the checkpoint record may also be recovered. Thus, a consistent view of the data on the storage may be recovered and may be recovered in a relatively short period of time.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Figure 1:
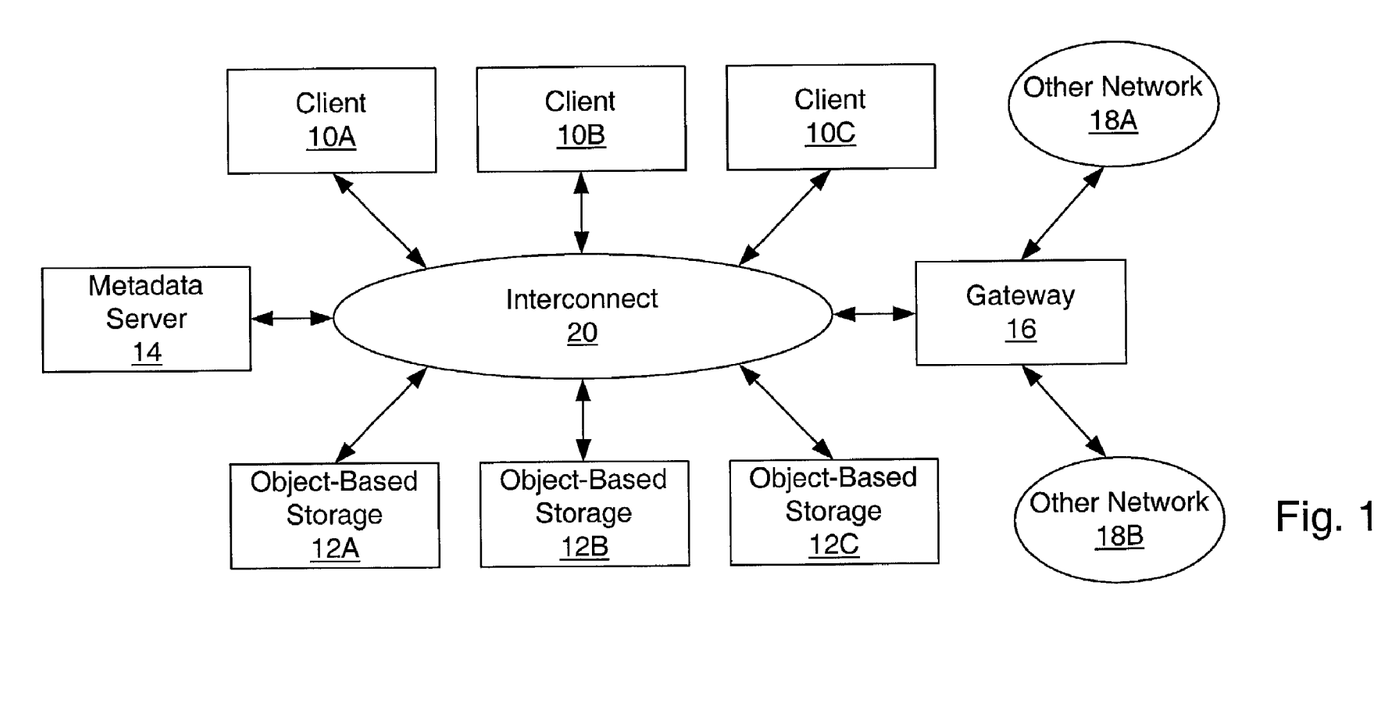
FIG. 1 is a block diagram of one embodiment of a network of computer systems.

Turning now to FIG. 1, a block diagram of a networked computing environment is shown. Other embodiments are possible and contemplated. In the embodiment of FIG. 1, the networked computing environment includes a plurality of clients 10A-10C, a plurality of object-based storages 12A-12C, a metadata server 14, a gateway 16, and other networks 18A-18B. Clients 10A-10C, storages 12A-12C, metadata server 14, and gateway 16 are connected via an interconnect 20. In various embodiments, metadata server 14 may be replicated for reliability and/or performance or may be implemented as software components in other nodes.

Generally, clients 10A-10C execute user applications that operate upon files stored on storages 12A-12C. A client 10A-10C may open a file by transmitting an open command to metadata server 14, which maps the file name used by the application to: (i) a file identifier (file ID) identifying the file to the storage 12A-12C storing the file; and (ii) a device identifier (device ID) identifying which storage 12A-12C stores the file. The metadata server 14 provides this information to the requesting client 10A-10C in response to the open command. The requesting client 10A-10C the performs various read and write commands directly to the storage 12A-12C identified by the device ID. Finally, the requesting client 10A-10C may perform a close command to the storage 12A-12C when the requesting client 10A-10C is finished accessing the file.

Object-based storage 12A-12C stores variable-sized objects instead of blocks. Each object is zero or more bytes, and a given object may be of an arbitrary length. For example, a file may be an object. Alternatively, a file may comprise two or more objects. The storage medium within object-based storage 12A-12C may still employ blocks, and in such an embodiment the object-based storage 12A-12C may perform the function of mapping files to blocks. As used herein, a block is a fixed-sized unit of storage space which is the smallest unit of allocation of space within the storage. Blocks may be of various sizes. For example, 4 kilobytes may be a suitable block size. Since the storage performs the block mapping function, access to the storage may be on an object basis (e.g. a file or a portion of a file) instead of a block basis. For example, a client 10A-10C may write one or more bytes to a file by transmitting a write command to the storage 12A-12C storing the file. The write command may include the file ID and the data to be written. The storage 12A-12C may handle merging the written bytes with the other data within the block. Previously, merging of writes into data blocks was performed by the client 10A-10C (by reading the affected block from the storage, updating the affected block locally in the client, and writing the affected block back to the storage). Similarly, a client 10A-10C may read one or more bytes from a file by transmitting a read command to the storage 12A-12C storing the file. The read command may include the file ID and the number of bytes to be read. Accordingly, the amount of data transmitted between the client and the storage may be reduced. Furthermore, client locking of blocks during updating may be eliminated.

Interconnect 20 may be a high bandwidth, low latency interconnect. For example, in one embodiment, interconnect 20 may be compatible with the Infiniband specification available from the Infiniband Trade Association. The Infiniband interconnect is based on switched serial links to device groups and devices. In other words, these devices or device groups may be connected with serial links either directly or through a switch. Devices on an InfiniBand network may be connected through switches and routers to several hosts. Each switch may operate a specific subnetwork of directly attached devices, while routers may interconnect several switches. InfiniBand devices may thus be connected in a fabric. Infiniband may use either packet or connection-based methods to communicate messages. Messages may include read or write operations, channel send or receive messages, atomic operations, or multicast operations. However, any interconnect having low latency may be used, including a variety of intranet or internet interconnects. For example, Fibre Channel or Ethernet interconnects may be used. For example, typical latencies from 1 to 100 microseconds may be provided by Infiniband.

Since clients directly access storage using a low latency interconnect, caching of file data on clients may be unnecessary. The low latency of the interconnect 20 may allow rapid access to file data, and the object-based nature of the storages 12A-12C may allow for relatively small amounts of data to be transferred for each request (e.g. less than a block). Accordingly, the complexities of client data caching may be eliminated.

Generally, each of clients 10A-10C and metadata server 14 may be a computing node. A computing node may comprise one or more computer systems operating in concert to perform a computing operation. A computer system may be a collection of: (i) one or more processors, interface circuitry, disk drives, network adapters, and other I/O devices; and (ii) an operating system and other applications which operate together to performing a designated computing function. Each computer system may be housed in a separate housing from other computer systems and may have a connection to interconnect 20.

Metadata server 14 stores file metadata. Among other things, the metadata stored by metadata server 14 may include the directory structures of the file systems within the networked computing environment shown in FIG. 1. The directory structures map a file name (which is a string of characters naming the file in a human-readable fashion) to a file ID (which is used to locate the file on the storage device, and may be a number having meaning only to the storage device storing the file). It is noted that there may be any number of metadata servers 14, as desired. Similarly, there may be any number of clients 10A-10C and storages 12A-12C, as desired.

Although storages 12A-12C have been described above as object-based storage, other embodiments may use any type of storage, as desired. Generally, storages 12A-12C may include any form of non-volatile computer readable medium. For example, storages 12A-12C may each include one or more fixed or removable disk drives, tape drives, CD-ROMs, writeable CD-ROMs, etc. Additionally, storages 12A-12C may include hardware and/or software for managing the mapping of file IDs to blocks within the storage, for object-based embodiments. In yet another alternative, storages 12A-12C may be block based storages with software providing the object-based interface. The software may operate on the metadata server (or a combination of the metadata server and the storages), on the client (or a combination of the client and the storages), or on any combination of the metadata server, the client, and the storages.

Gateway 16 may be a computer system bridging from interconnect 20 to other networks 18A-18B. The other networks 18A-18B may be any form of network (e.g. the Internet, intranets, etc.). Additionally, one or more of the other networks may be networks interconnected by interconnect 20.

It is noted that clients 10A-10C, metadata server 14, object-based storages 12A-12C, and gateway 16 may each have independent connections to interconnect 20. Each of clients 10A-10C, metadata server 14, object-based storages 12A-12C, and gateway 16 may transmit messages to any other device connected to interconnect 20. Interconnect 20 may route the messages to the addressed device on interconnect 20.

Figure 2:
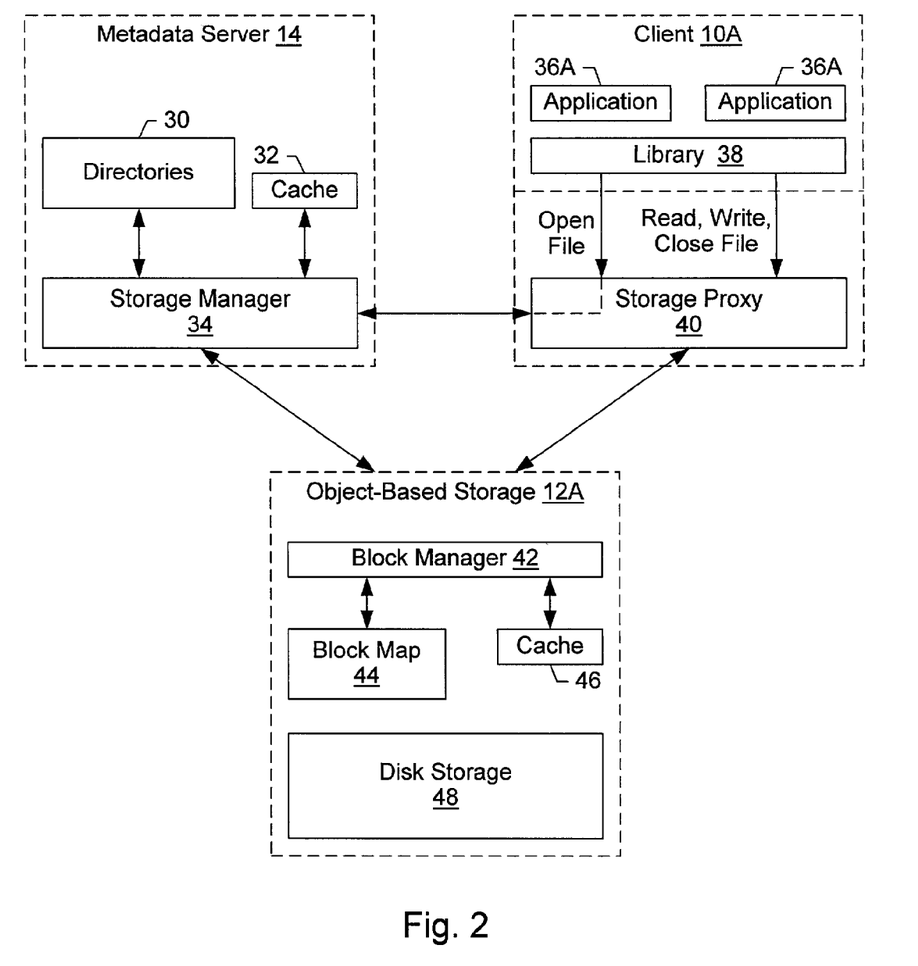
FIG. 2 is a block diagram of one embodiment of a client, a metadata server, and an object-based storage shown in FIG. 1.

Turning now to FIG. 2, a block diagram illustrating one embodiment of metadata server 14, client 10A, and object-based storage 12A in greater detail is shown. Other embodiments are possible and contemplated. In the illustrated embodiment, metadata server 14 includes a set of directories 30, a cache 32, and a storage manager 34. Client 10A includes one or more applications 36A-36B, a library 38, and a storage proxy 40. Object-based storage 12A includes a block manager 42, a block map 44, a cache 46, and a disk storage 48.

Generally, client 10A may execute applications 36A and 36B to perform various user-desired operations. The applications 36A-36B may use a variety of library routines which may be shared by the applications executable on client 10A. Among the library routines may be routines to open a file, read a file, write a file, and close a file. Applications may use these routines to access files. Applications 36A-36B and library 38 may operate at user privilege level, while storage proxy 40 may operate at a supervisor privilege level generally reserved for the operating system kernel. Storage proxy 40 may be part of the operating system kernel of client 10A. In other embodiments, both library 38 and storage proxy 40 may operate at the user privilege level, or at the supervisor privilege level, as desired.

In response to an application executing the open file routine, library 38 passes an open file command to the operating system kernel (e.g. to the storage proxy 40). The storage proxy 40 generates an open file command on the interconnect 20, addressed to metadata server 14. It is noted that storage proxy 40 may operate as a null driver in this case, simply passing the open file command as a message on interconnect 20 to metadata server 14.

Metadata server 14 (and more particularly storage manager 34) receives the open file command and consults the directories 30 to translate the file name to a file ID for one of storages 12A-12C. Storage manager 34 returns the file ID (and the device ID of the device storing the file, e.g. storage 12A) to storage proxy 40, which associates the file ID with the file name (or a file handle generated by library 38).

Subsequent read and write commands to the file are received from library 38 by storage proxy 40. The read and write commands include the file name or file handle. Storage proxy 40 generates corresponding read and write commands including the file ID corresponding to the file name or file handle, and transmit the read and write commands directly to storage 12A. As used herein, a command is directly transmitted from a client to a storage if the command is routed from the client to the storage without any intervening interpretation of the command other than to route the command to the destination storage. In other words, various circuitry included within interconnect 20 may interpret the address information used to route the command, but does not otherwise change the command. Similarly, a client may directly access a storage if commands are directly transmitted to the storage.

Storage 12A receives the read and write commands from client 10A. Block manager 42 may access a block map 44 to map the file ID to a set of one or more blocks within disk storage 48. The block affected by the command may thereby be identified, and the command may be performed. In the case of the write command, the block may be updated. In one embodiment described in more detail below, storage 12A may employ a copy on write protocol in which, rather than updating a block directly in response to a write command, a new block may be allocated and may be included in the block map for the file. When the file is closed or synchronized, the old block may be released for allocation to another file. Additional details for such an embodiment are provided further below. In the case of a read, the requested data may be read and provided back to the client 10A.

Generally speaking, the block map converts each file ID to a list of zero or more blocks corresponding to the file. In one embodiment, the file ID is an inode number identifying an inode corresponding to the file. The inode includes pointers (directly or indirectly) to each block storing the file data. The inode may also include various file attributes, as desired.

It is noted that caches 32 and 46 may be used by storage manager 34 and block manager 42 (respectively) to accelerate operations. Caches 32 and 46 may be higher speed memories than the memory storing directories 30 and block map 44. For example, directories 30 and block map 44 may be stored on local disk storage of metadata server 14 and storage 12A, respectively. Caches 32 and 46 may be static random access memory (SRAM) or dynamic random access memory (DRAM), for example. Generally, caches 32 and 46 may be volatile memory while directories 30 and block map 44 maybe stored in non-volatile memory.

Storage manager 34 may use cache 32 to cache recently accessed directory entries. If the directory entries are accessed again, they may be read from the cache 32 instead of directories 30.

Block manager 42 may use cache 46 as a working memory for blocks and block map information (e.g. inodes and allocation maps). If a block is read from disk storage 48 (or is allocated for a write), the block may be stored in cache 46. If the block is read again, the block may be accessed in cache 46 and data provided to client 10A. If the block is allocated for a write, the block may be stored in cache 46 and written to disk storage 48 at a later time.

Storage manager 34 and storage proxy 40 may each preferably be one or more software routines included within the kernel of the operating system of metadata server 14 and client 10A, respectively. Block manager 42 may be implemented as one or more software routines executable by a processor embedded in storage 12A. However, any combination of hardware and/or software may be used to implement any of storage manager 34, storage proxy 40, and block manager 42.

It is noted that, in some embodiments, a file may be represented by multiple objects on multiple object-based storage devices. In such a case, multiple file IDs may be used to locate the objects comprising the file. Furthermore, in some embodiments, object-based storage devices may be a combination of storage nodes (e.g. a Redundant Array of Inexpensive Disks (RAID) storage system, data striping storage systems, replicated storage systems, or concatenated storage systems). In such embodiments, the metadata server may provide the client with several device IDs in response to the open command, along with an indication of which device should be used for each read or write.

Figure 3:
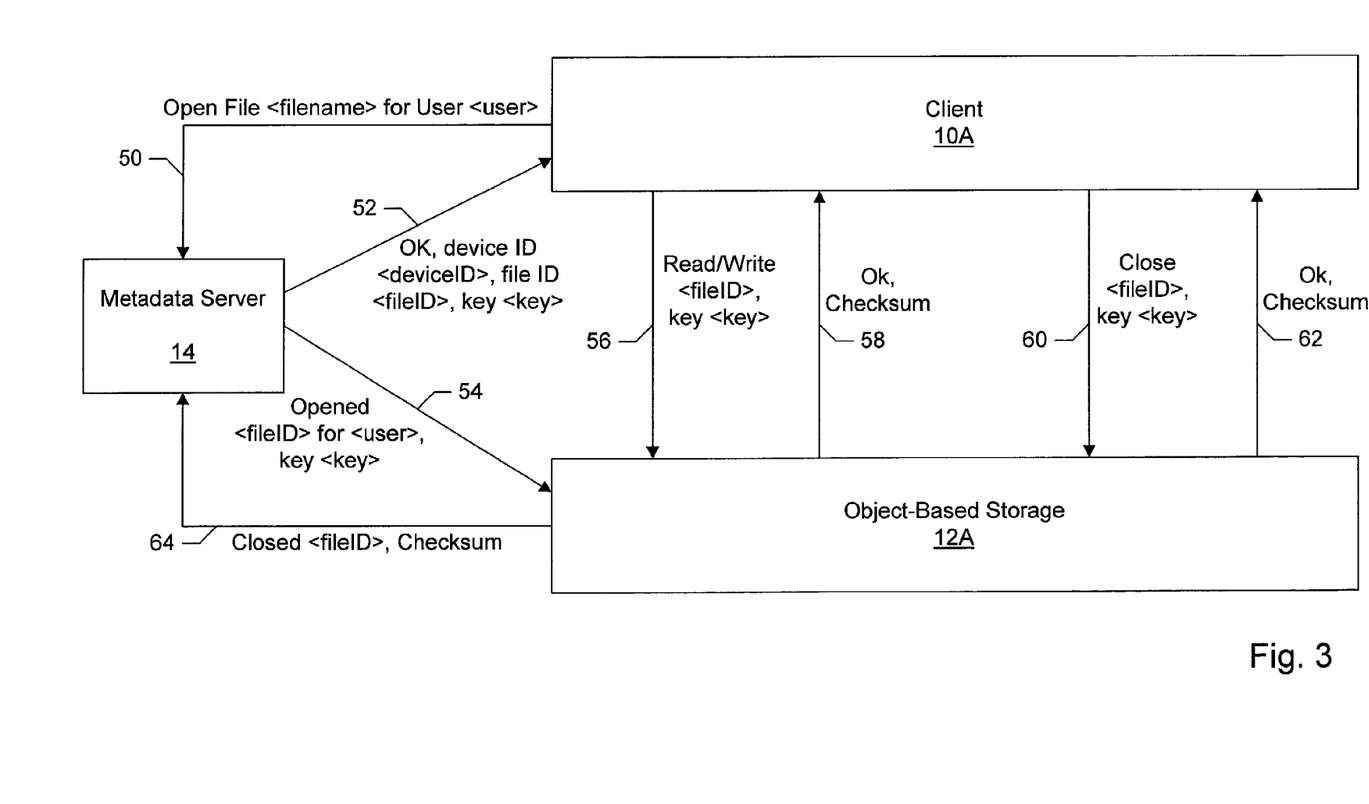
FIG. 3 is a block diagram illustrating one embodiment of a client operation on a file for the network shown in FIG. 1.

Turning next to FIG. 3, a diagram illustrating the commands forming a file access are shown according to one embodiment of the networked system shown in FIGS. 1 and 2. Other embodiments are possible and contemplated. Client 10A, object-based storage 12A, and metadata server 14 are illustrated in FIG. 3. Similar commands may be used between other clients and/or storages. It is noted that the commands are routed between client 10A, metadata server 14, and storage 12A via interconnect 20 shown in FIG. 1. Terms enclosed in less than ("<") and greater than (">") signs are placeholders for values which are inserted in the specific instance of the command. For example, <filename> is a placeholder for the string of characters comprising the name of the file to be opened.

Client 10A initiates a file access by sending an open file command to metadata server 14 (reference numeral 50). The open file command may include an encoding identifying the command as an open file command, and further includes the file name of the file to be opened. Additionally, the open file command may include a user identification (e.g. user name or a number) identifying the user which is requesting that the file be opened. It is noted that, as used herein, opening a file refers to converting the file name to a value which can be used to access the file. During the opening of the file, permission information may be checked to ensure that the file is accessible and/or writeable by the user, etc., as desired.

Metadata server 14 responds to the open file command with a positive response (reference numeral 52). Metadata server 14 may also respond with a negative response if an error condition is detected (e.g. the file does not exist in directories 30, or the user does not have permission to open the file, etc.). The positive response includes a file ID identifying the file on the storage storing the file. As used herein, the file identifier (file ID) may be any value identifying the file to the storage storing the file. The file ID may be a number, for example, rather than the string of characters comprising the file name. In one embodiment, the file ID may be an "I-number" identifying an inode which locates the file with the storage. More particularly, the I-number may be an index into an inode file within the block map 44. The corresponding inode may be stored at that index.

The positive response may further include a device ID. The device ID may be an address for the storage storing the file (e.g. storage 12A, in this example), which may be used by interconnect 20 for routing purposes. Alternatively, interconnect 20 may be a shared communication medium in which commands are visible to all devices and the device ID may be used by the storage 12A to detect commands directed at the device.

Additionally, the positive response may include an access key. The access key may be provided for security purposes, and may be encrypted. The key may include permission information, and may further serve to identify client 10A as the one who opened the file. Metadata server 14 may transmit a message (reference numeral 54) to storage 12A indicating that the file was opened. The message may include the file ID, and may further include the user name and the same access key sent to client 10A. The positive response may further include a checksum for the file (not shown), if desired.

Client 10A may perform one or more read or write commands (access commands) to the file. An exemplary access command is illustrated at reference numeral 56. The access command includes an encoding of the read or write nature of the command, and the file ID. Additionally, the access command may include an offset (not shown) into the file to locate the data desired by the operation. Other embodiments may locate the data via other mechanisms. The access command may include a size identifying the number of bytes to be read or written. If the access command is a write, the data to be written is also included. As noted above, the size of the access command may be a number of bytes less than or greater than the number of bytes in a block. Furthermore, the command may not be aligned to block boundaries. Instead, the size of the command may be the actual number of bytes actually desired by client 10A. The access command may also include the access key, if desired.

Object-based storage 12A responds to the access command with a positive response (reference numeral 58). If the access command is a read, the positive response includes the read data. The positive response may further include a checksum for the data, if desired. Storage 12A may response with a negative response if an error is detected.

Once client 10A has completed the access commands to the file, client 10A may transmit a close file command (reference numeral 60). The close file command may include the file ID, and may further include the access key. Storage 12A may respond with a positive response (reference numeral 62), which again may include a checksum, if desired. If an error is detected during the file close, storage 12A may respond with a negative response instead.

Additionally, in response to the file close command, storage 12A may transmit a message (reference numeral 64) to metadata server 14. The message may indicate the file ID of the file that has been closed, and may further include a new checksum for the file, if the file has been modified.

In one embodiment, storage 12A may treat the commands of a file access as a transaction. More particularly, the modifications to the file in response to one or more write commands may all be performed successfully, or none of them may be performed and the file may remain in the same state that it was prior to the transaction. The transaction is committed via a commit command. In the illustration, the file close command may be the commit command for storage 12A. Additionally, a synchronization command (e.g. the Unix fsync command) may be supported which may commit all prior changes without closing the file. By treating the updates as a transaction, file integrity may be enhanced in the presence of a system failure. Since the updates are atomically performed via the commit command (rather than possibly partially performed over time as the various write commands are performed), the commit will have been processed either before the system failure (and thus the file updates are recorded in storage 12A after the failure) or after the system failure (and thus the file updates are not recorded in storage 12A).

FIGS. 4-8 illustrate one embodiment of the transactional interface and other details of one embodiment of storage 12A which may enhance the reliability of storage 12A.

Figure 4:
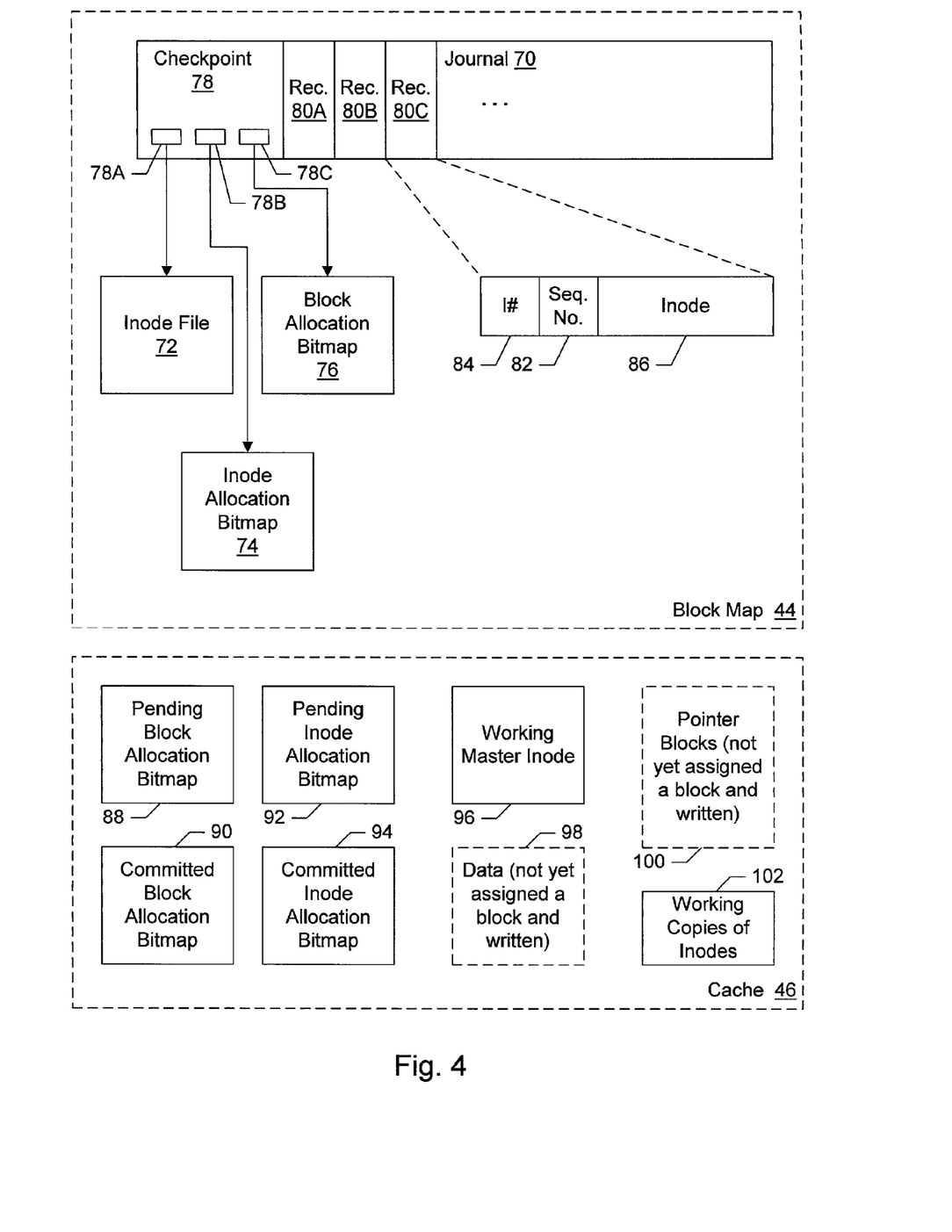
FIG. 4 is a block diagram of one embodiment of a block map and a cache for one embodiment of an object-based storage.

Turning next to FIG. 4, a block diagram of one embodiment of block map 44 and cache 46 is shown. Other embodiments are possible and contemplated. In the embodiment of FIG. 4, block map 44 includes a journal 70, an inode file 72, an inode allocation bitmap 74, and a block allocation bitmap 76. Journal 70 includes a checkpoint record 78 with pointers to the inode file 72, the inode allocation bitmap 74, and the block allocation bitmap 76. Journal 70 further includes one or more records 80A-80C. Record 80C is shown in exploded view as an example of a record. Record 80C includes a sequence number 82, an I-number 84, and an inode 86. Cache 46 includes a pending block allocation bitmap 88, a committed block allocation bitmap 90, a pending inode allocation bitmap 92, a committed inode allocation bitmap 94, a working master inode 96, unwritten data blocks 98, unwritten pointer blocks 100, and working copies of inodes 102.

Generally, storage 12A attempts to improve reliability by atomically performing any write which commits a file update. A write to a block is an approximation of atomicity, since a write smaller than a block does not occur on disk storage 48. A write to multiple blocks is not atomic, since the write to one block completes before the write to the next block begins. Generally, an action is "atomic" or performed "atomically" if the action delivers the specified result or, if the action does not complete (e.g. due to error), leaves all parts of the system unaffected by the attempt to perform the action. For example, a write to a file (a "file update") may be atomic if either all bytes in the file and any updates to the file metadata are updated or none of the bytes nor the file metadata are updated (e.g. if a system crash occurs).

When an update to a block within a file is detected, the block is copied to a new block and the update is performed to the new block. Pointers within the file's inode structure may then be updated to indicate the new block. The updated inode is held in working memory (e.g. cache 46) until the file is committed. Writing the inode to a non-volatile memory may commit all of the updates to the various blocks atomically (since the inode is less than a block in size, and thus a write of an inode is atomic).

Inode file 72, inode allocation bitmap 74, and block allocation bitmap 76 may be larger than a block, and thus may not be atomically written. Similar to the update to other files, the blocks within inode file 72 which are to be updated with committed inodes may be copied and the updated inodes may be written to the copied blocks. A working copy of the inode pointing to the inode file (the master inode) may be updated to indicate the copied blocks. Working copies of the inode allocation bitmap 74 and the block allocation bitmap 76 may be maintained by storage 12A. It is noted that, while files 72-76 are illustrated in FIG. 4 as part of block map 44, which may be a nonvolatile storage separate from disk storage 48, files 72-76 may preferably be stored in disk storage 48. Journal 70 may preferably be stored outside of disk storage 48 (e.g. another local disk, or some other nonvolatile memory) to reduce competition for writes to disk storage 48 for the underlying file data.

Journal 70 is used to record updated copies of committed inodes (inodes corresponding to committed files). Generally, checkpoint record 78 records inodes for inode file 72, inode allocation bitmap 74, and block allocation bitmap 76. More particularly, inode 78A corresponds to inode file 72 and is also referred to as the master inode, inode 78B corresponds to inode allocation bitmap 74, and inode 78C corresponds to block allocation bitmap 76. A checkpoint record containing these three inodes 78A-78C is a stable copy of these files corresponding to the committed updates at the time the checkpoint was made.

Subsequent to creating the checkpoint, inodes corresponding to committed files are written into the journal (e.g. records 80A-80C) in response to the commit commands corresponding to those files. The updates to the underlying file data are completed prior to writing the corresponding inode to journal 70, and thus the atomic write of the inode to journal 70 may indicate the successful completion of the file transaction represented by the inode. In one embodiment, storage 12A copies the blocks of the underlying files which are updated to new blocks and performs the update in the new blocks. Pointers within the inode structure of a working copy of the inode are updated to point to the new blocks. When the working copy of the inode is committed to the journal, all of the updates to the file are atomically performed.

Thus, writes to files and to the files storing file metadata (inodes, allocation bitmaps, etc.) are all performed atomically. Reliability of storage 12A may be high, since the window for failure during an atomic update is narrow as compared to non-atomic updates. Failure recovery using the journal is described in more detail below.

An inode record in journal 70 for the illustrated embodiment includes a sequence number field 82, an I-number field 84, and an inode field 86. Inode field 86 stores the updated inode. The I-number of the inode is stored in I-number field 84, thus identifying the entry within inode file 72 in which the inode belongs.

The sequence number field stores a sequence number which identifies the end of journal 70. Journal 70 may be circular in nature, with records being written in consecutive locations of the journal until the physical end of the journal is reached. When the physical end is reached, the next write is performed at the physical beginning of the journal. Each record is written with a larger sequence number than the previous record. Thus, when scanning the journal, the end is reached if the sequence number of the next-encountered record is less than the sequence number of the previously-encountered record.

It is noted that, while the checkpoint record 78 is shown in FIG. 4 at the physical beginning of journal 70, the checkpoint record 78 may appear at any location within journal 78. The checkpoint record 78 is inserted into the journal consecutive to the most recently committed inode at the time the checkpoint is made. Anything prior to the checkpoint record within journal 70 is reflected in the files pointed to by the checkpoint record 78. It is noted that, in one embodiment, the pointers to files 72-76 may each be an inode, with the pointers within the inode structure indicating blocks storing data from the corresponding file. It is further noted that, in addition to the inode records, other information may be entered into the journal to further accelerate recovery from a system failure. For example, records of the allocation and release of blocks corresponding to a committed file may be written, to allow for quicker reconstruction of the allocation bitmaps.

Cache 46 may be used to store working copies of files and inodes which are in the process of being updated (i.e. uncommitted transactions are outstanding to the files). For example, committed block allocation bitmap 90 may store a bitmap identifying those blocks of disk storage 48 that are storing data corresponding to committed files. Pending block allocation bitmap 88 may store a bitmap identifying those blocks which are storing data corresponding to pending file updates (those updates that have yet to be committed). Similarly, committed inode allocation bitmap 94 may store a bitmap identifying those modes which correspond to committed files, and pending inode allocation bitmap 92 may store a bitmap identifying those inodes which correspond to pending files. Inodes are allocated to files on creation. Thus, an inode may be recorded in pending inode allocation bitmap 92 if the corresponding file transaction is a transaction which created the file.

Working master inode 96 may be a working copy of master inode 78A pointing to the inode file. As inodes are committed, they may be written both to journal 70 and to copied blocks corresponding to inode file 72. Working master inode 96 may include pointers to the copied blocks, and may thus represent a copy of the inode file 72 reflecting the currently committed inodes. Storing working master inode 96 to a checkpoint record in journal 70 atomically updates the inode file 72. As an alternative to maintaining working master inode 96, checkpoint creation may include copying the inode file from the previous checkpoint and updating the inodes from the previous checkpoint to the end of the journal. In yet another alternative, the inode file could include two copies of each inode, with alternate copies being updated each time the inode is written.

Storage 12A may be configured to defer writing data blocks to disk to allow for multiple blocks of data corresponding to contiguous data within a file to be written to contiguous blocks on disk. For such an embodiment, cache 46 may store the unwritten data 98. Similarly, writing pointer blocks for dual indirect inodes (shown in FIG. 11 below) may be deferred. For such an embodiment, cache 46 may store unwritten pointer blocks 100.

Working copies of inodes 102 are inodes corresponding to files for which an update transaction is in progress. An inode is removed from working copies of inodes 102 and is written to journal 70 to successfully commit the transaction.

Figure 5:
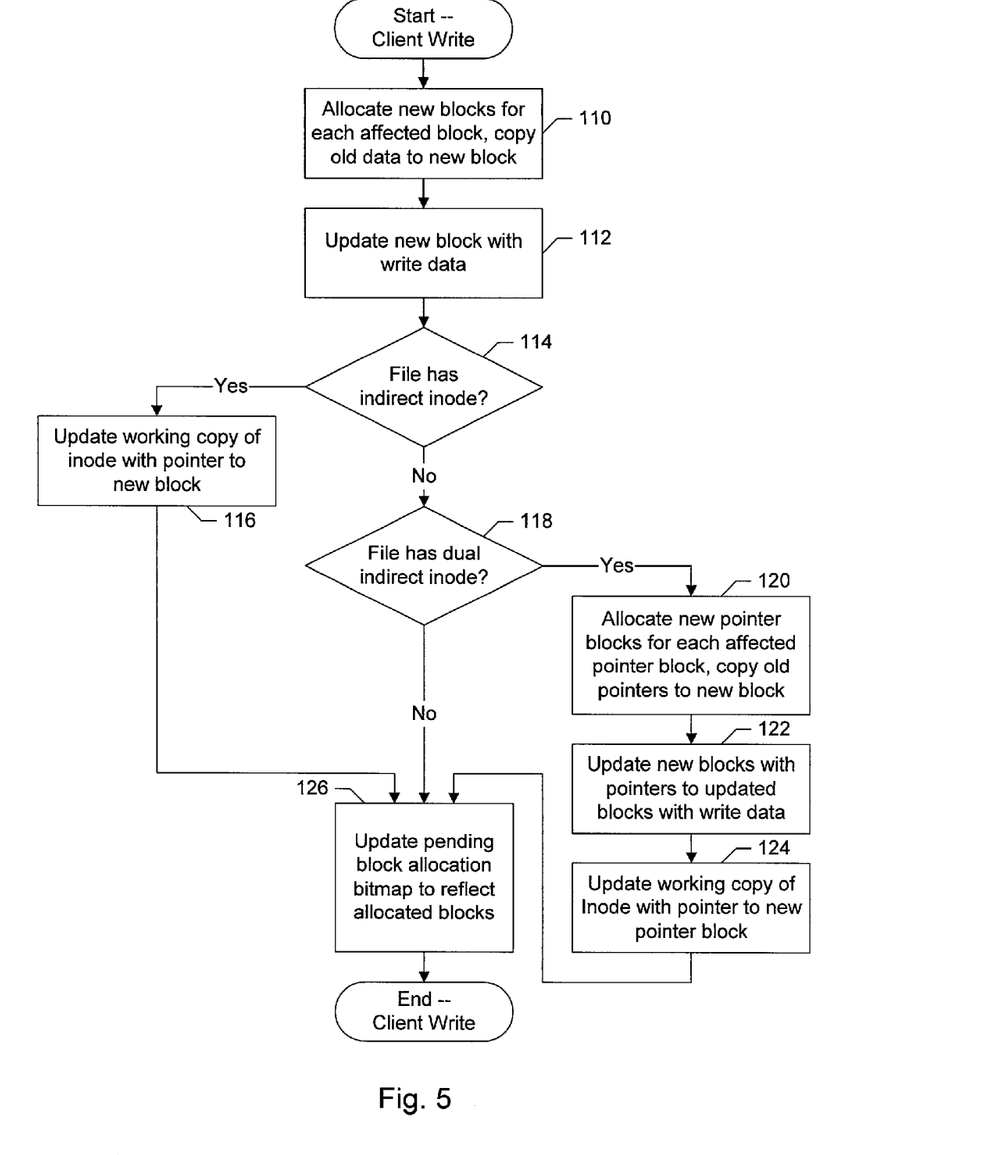
FIG. 5 is a flowchart illustrating operation of one embodiment of an object-based storage in response to a client write.

Turning now to FIG. 5, a flowchart is shown illustrating operation of one embodiment of storage 12A (and more particularly block manager 42, for the embodiment shown in FIG. 2) in response to a write command from a client. Other embodiments are possible and contemplated. While the blocks shown in the flowchart of FIG. 5 are illustrated in a particular order for ease of understanding, any suitable order may be used. Furthermore, various blocks may be performed in parallel, as desired.

Storage 12A allocates new blocks for each block affected by the write. The allocated blocks are blocks which are free in both the pending block allocating bitmap 88 and the committed block allocation bitmap 90. Storage 12A copies the data from the original blocks affected by the write to the new blocks (block 110). Storage 112 updates the new blocks with the data corresponding to the write (block 112). In this manner, the original data (prior to the write) is retained in the original blocks. If the write is not committed at a later point, the original data is still available in the original blocks. It is noted that, if the write is creating a new file, an inode may be allocated as well.

Since new blocks have been allocated to the file, storage 12A updates the inode for the file to point to the new blocks. More particularly, the working copy of the inode is updated, and the working copy of the inode is committed when the writes are committed with a commit command. In the present embodiment, there may be at least three types of inodes: direct inodes in which the data is stored in the inode (for small files), indirect inodes in which the inode stores pointers to blocks storing the file data, and dual indirect inodes in which the inode stores pointers to a first set of one or more blocks, and the first set of blocks store pointers to the blocks storing the file data. If the inode is a direct inode, allocating the new block for the updates results in updating the working copy of the inode as well, since the data is stored in the inode. If the inode is indirect (decision block 114), then storage 12A updates the working copy of the inode by replacing the pointer to the original block with a pointer to the newly allocated block (block 116). The committed inode (in inode file 72 or in journal 70) retains a pointer to the previously allocated block, and thus the contents of the file prior to the update are retained.

On the other hand, if the inode for the file is dual indirect (decision block 118), storage 12A allocates an additional block for the pointer block including the pointer pointing to the block being updated (block 120). Again, the additional block is a block which is free in both the pending block allocation bitmap 88 and the committed allocation bitmap 90. Storage 12A copies the pointers from the original pointer block to the additional block, and inserts the pointer to the newly allocated block into the additional block (block 122). Storage 12A then updates the working copy of the inode to replace the pointer to the original pointer block with a pointer to the additional block (block 124).

Finally, no matter which type of inode the file has, storage 12A updates the pending block allocation bitmap to reflect the allocated block(s) (block 126). It is noted that the operation illustrated in FIG. 5 need not be performed immediately in response to a client write. Storage 12A may accumulate one or more writes corresponding to a transaction, and allocate blocks for the one or more writes as a whole. This may allow for optimization by allocating several blocks of the file physically adjacent on the disk storage, which may reduce seeks when the file is read and/or written. Any number of writes may be handled in this fashion, including deferring until the transaction including the writes is committed.

Figure 6:
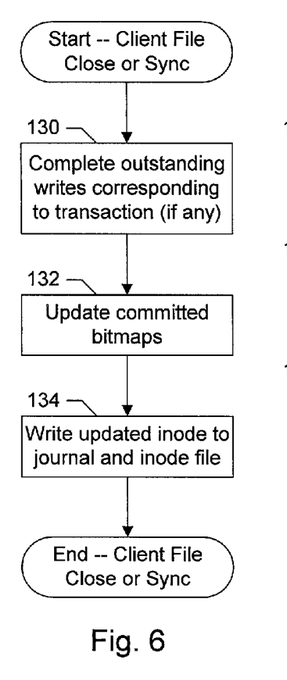
FIG. 6 is a flowchart illustrating operation of one embodiment of an object-based storage in response to a commit command.

Turning now to FIG. 6, a flowchart is shown illustrating operation of one embodiment of storage 12A (and more particularly block manager 42, for the embodiment shown in FIG. 2) in response to a commit command from a client. Other embodiments are possible and contemplated. While the blocks shown in the flowchart of FIG. 6 are illustrated in a particular order for ease of understanding, any suitable order may be used. Furthermore, various blocks may be performed in parallel, as desired.

In the illustrated embodiment, the commit command may comprise either a file close command or an fsync command from the client. Other embodiments may include more or fewer commit commands, and may include alternative commands to these commands.

Storage 12A completes any writes corresponding to the transaction which have not yet been written to disk storage (block 130). In some embodiments, writes may not be deferred and block 130 may be optional. Additionally, storage 12A updates the committed block allocation bitmap 90 and the committed inode allocation bitmap 94 to reflect the file changes (block 132). That is, blocks which are freed (because newly allocated blocks replace the blocks in the file) are marked as free in the committed block allocation bitmap and blocks which are allocated are marked as allocated. Similarly, inodes which are freed are marked as freed and inodes which are allocated are marked as allocated. It is noted that inodes may be allocated to each version of a file as that file is created, and deallocated as each version of the file is deleted. For example, versions are created when one or more updates to a file are made, and the updates are committed when the file commit command is received. The previous version's inode may be freed in response to the new version's commit, or when the new version is part of a new checkpoint.

Storage 12A writes the working copy of the inode corresponding to the file to the journal (block 134). The writing of the inode to the journal atomically commits the file changes performed by the transaction. Additionally, the inode may be written to the inode file. The write to the inode file may be accomplished in a manner similar to client writes to blocks. That is, the block of the inode file storing the inode corresponding to the transaction may be copied to a newly allocated block, and the newly allocated block may be updated with the inode. The working copy of the master inode may be updated to point to the newly allocated block. A subsequent atomic write of the working copy of the master inode to a checkpoint record of the journal 70 atomically commits the inode updates (as described below in FIG. 7).

Figure 7:
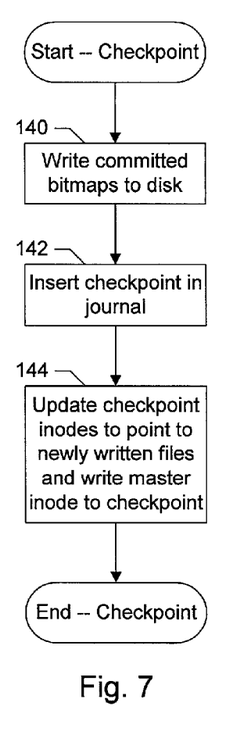
FIG. 7 is a flowchart illustrating operation of one embodiment of an object-based storage in response to a checkpoint.

Turning next to FIG. 7, a flowchart is shown illustrating operation of one embodiment of storage 12A (and more particularly block manager 42, for the embodiment shown in FIG. 2) to create a checkpoint. Other embodiments are possible and contemplated. While the blocks shown in the flowchart of FIG. 7 are illustrated in a particular order for ease of understanding, any suitable order may be used. Furthermore, various blocks may be performed in parallel, as desired.

Generally, a checkpoint is performed before the preceding checkpoint is overwritten within journal 70. Various triggers may be used to cause a checkpoint, including, for example, an allocation of all blocks to either pending updates or prior data blocks (or an allocation of a predetermined percentage of the blocks), a periodic timer, etc. Any mechanism for causing checkpoints to occur may be used.

Storage 12A writes the committed allocation bitmaps (committed block allocation bitmap 90 and committed inode allocation bitmap 94) to disk storage (e.g. disk storage 48) (block 140). Storage 12A inserts a checkpoint record at the current point in the journal 70 (block 142). Storage 12A writes the working master inode 96 to the checkpoint record, thereby atomically updating the inode file 72 (block 144). Additionally, storage 12A writes inodes locating the bitmap files written in block 140 into the checkpoint record, thereby atomically updating those files.

Figure 8:
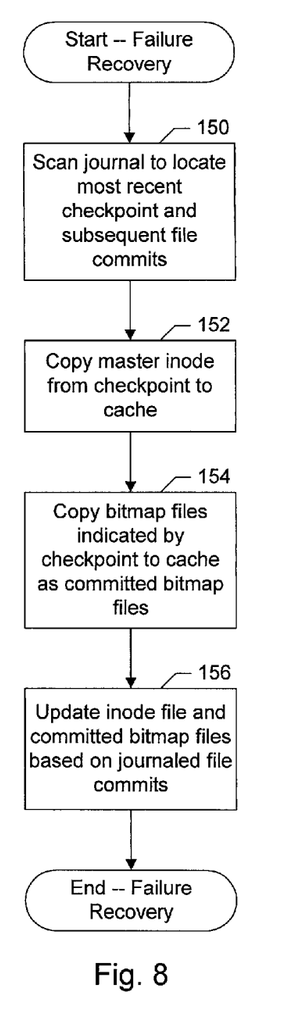
FIG. 8 is a flowchart illustrating operation of one embodiment of an object-based storage in response to a system crash.

Turning now to FIG. 8, a flowchart is shown illustrating operation of one embodiment of storage 12A (and more particularly block manager 42, for the embodiment shown in FIG. 2) to recover from a failure. Other embodiments are possible and contemplated. While the blocks shown in the flowchart of FIG. 8 are illustrated in a particular order for ease of understanding, any suitable order may be used. Furthermore, various blocks may be performed in parallel, as desired.

After a failure, the contents of cache 46 are indeterminate. Thus, uncommitted updates (which are recorded only in cache 46 via the working inodes 102 and 96 and pending bitmaps 88 and 92) are lost. However, committed updates are recorded either in files 72-76 or journal 70, and thus storage 12A may be recovered to an uncorrupted state.

More particularly, storage 12A scans the journal 70 to locate the most recent checkpoint and any subsequent file commit records (records 80A-80N in FIG. 4) (block 150). Storage 12A copies the master inode from the checkpoint to cache 46 as working master inode 96 (block 152). Storage 12A copies the bitmap files 74 and 76 to cache 46 as the committed bitmaps 90 and 94 (block 154). Storage 12A updates the inode file (using the copying of inode file blocks and updating working master inode 96 as described above) to reflect the committed inodes reflected in the journal (block 156). Additionally, storage 12A updates the committed bitmaps to reflect the committed inodes. In this manner, the committed state of storage 12A may be rapidly recovered from the failure.

Figure 9:
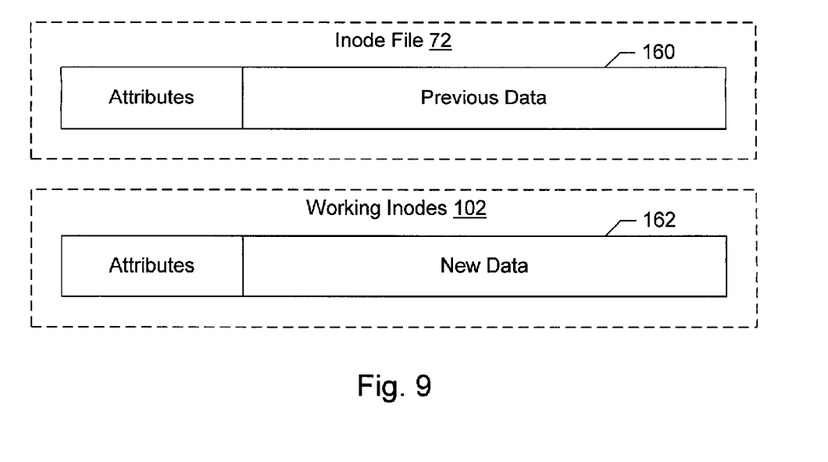
FIG. 9 is an example of an inode and an updated inode.

Turning now to FIG. 9, a block diagram of a first example of an inode 160 within inode file 72 and a corresponding updated inode 162 within working inodes 102 is shown. FIG. 9 is an example of a direct inode. Thus, the data corresponding to the file is stored within inodes 160 and 162. Inode 160 stores the data prior to the update, and inode 162 stores the updated data (although not every byte within the data need be updated). An atomic write of inode 162 thus commits the updates to the file atomically.

Figure 10:
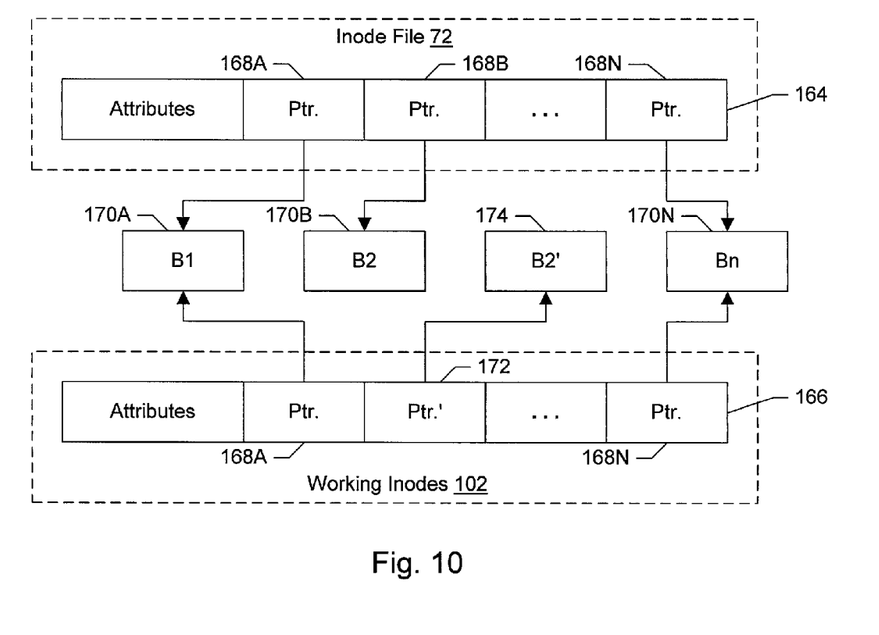
FIG. 10 is a second example of an inode and an updated inode.

FIG. 10 is a block diagram of a second example of an inode 164 within inode file 72 and a corresponding updated inode 166 within working inodes 102. FIG. 10 is an example of a indirect inode. Thus, each of inodes 164 and 166 include pointers to blocks storing the file data. For example, inode 164 includes pointers 168A, 168B, and 168N to blocks 170A, 170B, and 170N. In the example of FIG. 10, block 170B has been updated with an uncommitted write to block 170B. Accordingly, inode 166 includes pointers 168A and 168N to unmodified blocks 170A and 170N (respectively). Additionally, inode 166 includes pointer 172 to updated block 174. An atomic update of inode 166 commits pointer 172 (and thus block 174) to the file. Block 170B becomes free via the atomic write of inode 166 as well.

Figure 11:
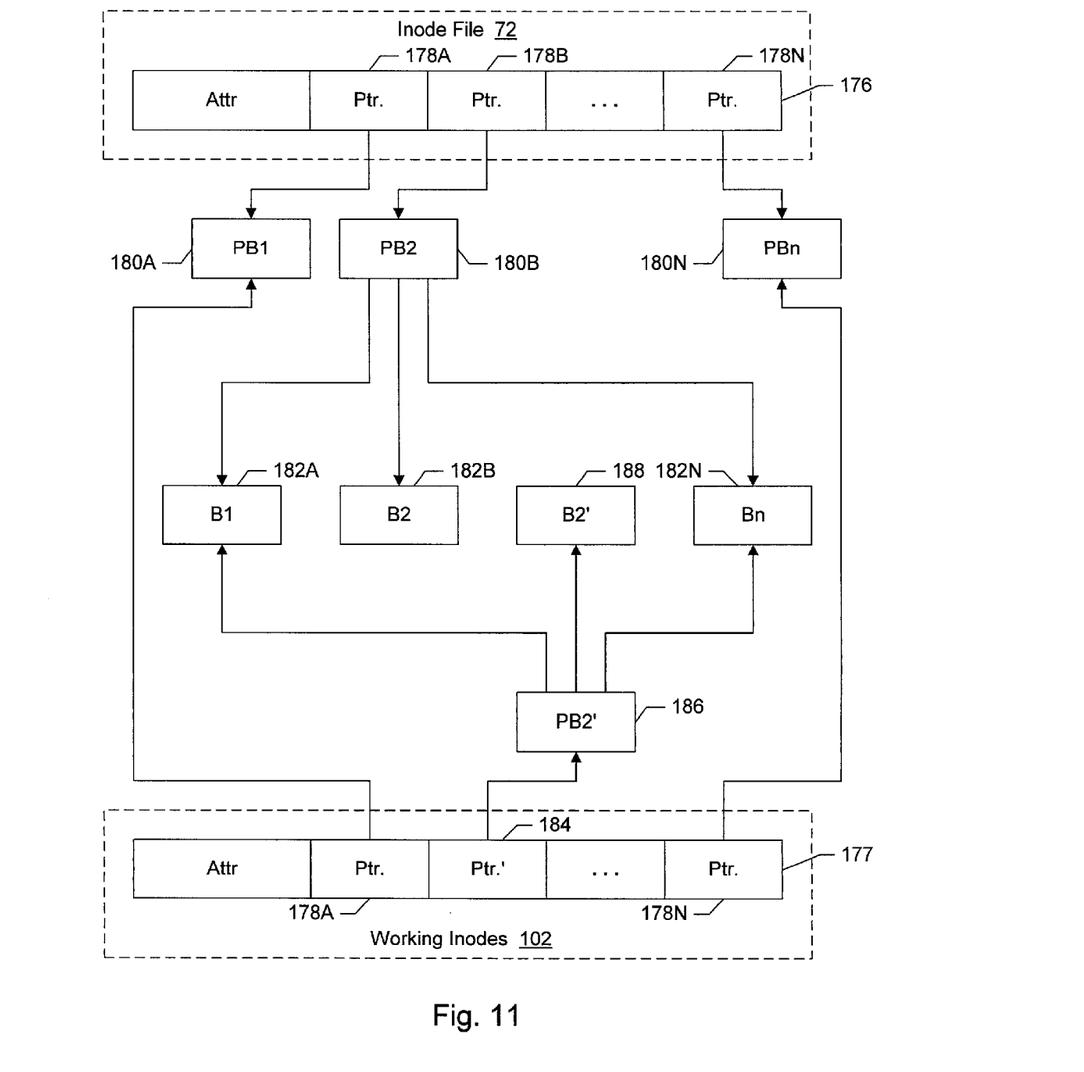
FIG. 11 is a third example of an inode and an updated inode.

FIG. 11 is a block diagram of a second example of an inode 176 within inode file 72 and a corresponding updated inode 177 within working inodes 102. FIG. 11 is an example of a dual indirect inode. Thus, inode 176 includes pointers 178A, 178B, and 178N to pointer blocks 180A, 180B, and 180N. Pointer block 180B includes pointers to blocks 182A, 182B, and 182N which store the file data. Pointer block 180B may include pointers to other blocks which store file data as well, and pointer blocks 180A and 180N include pointers to other blocks (not shown). In the example of FIG. 10, block 182B has been updated with an uncommitted write to block 182B. Accordingly, inode 177 includes pointers 178A and 178N to unmodified pointer blocks 180A and 180N (respectively). Additionally, inode 177 includes pointer 184 to updated pointer block 186. Updated pointer block 186 includes pointers to unmodified blocks 182A and 182N and a pointer to modified block 188. An atomic update of inode 177 commits pointer 184 (and thus pointer block 186 and block 188) to the file. Pointer block 180B and block 182B become free via the atomic write of inode 177 as well.

Numerous variations and modifications will become apparent to those skilled in the art once the above disclosure is fully appreciated. It is intended that the following claims be interpreted to embrace all such variations and modifications.

What is claimed is:

1. A storage including a non-volatile computer readable storage medium, the storage comprising:
   a non-volatile memory storing a first mode locating a first file in said storage and also storing a journal comprising a list of committed inodes; and
   a block manager configured to copy said first mode to a second inode, wherein said block manager is configured to change said second inode in response to updates to said first file, and wherein said block manager is configured to atomically update said first file in response to a commit of said first file by writing said second inode to said non-volatile memory, whereby said second inode locates said first file in said storage, and wherein said block manager is configured to record said second inode in said journal.

2. The storage as recited in claim 1 wherein said commit of said first file comprises a commit command received from an external source which updates said first file.

3. The storage as recited in claim 2 wherein said commit command comprises a file close command.

4. The storage as recited in claim 2 wherein said commit command comprises an fsync command.

5. The storage as recited in claim 1 wherein said journal further includes a checkpoint record including a description of an inode file, a block allocation bitmap, and an inode allocation bitmap.

6. The storage as recited in claim 5 wherein the description comprises inodes for each of said inode file, said block allocation bitmap, and said inode allocation bitmap.

7. An apparatus comprising:
   a computing node comprising at least one computer system, the computing node configured to perform one or more write commands to a file and a commit command committing the one or more write commands to said file; and
   a storage including a non-volatile computer readable storage medium, the storage coupled to receive said one or more write commands and said commit command, wherein said storage is configured to copy one or more blocks of said file to a copied one or more blocks, said one or more blocks updated by said one or more write commands, and wherein said storage is configured to update said copied one or more blocks with write data corresponding to said one or more write commands, and wherein said storage is configured to copy a first inode locating said file in said storage to a second inode and to update pointers within said second inode pointing to said one or more blocks to point to said copied one or more blocks, and wherein said storage is configured to atomically update said file by writing said second inode responsive to said commit command, and wherein said first inode is stored in an inode file, and wherein said inode file is identified by a master inode, and wherein said inode file is atomically updated with said second inode by writing said master inode subsequent to said commit command.

8. The apparatus as recited in claim 7 wherein said commit command comprises a file close command.

9. The apparatus as recited in claim 7 wherein said commit command comprises an fsync command.

10. A method comprising:
copying a first inode to a second inode, wherein said first inode locates a first file in a storage;
modifying said second inode in response to one or more changes to said first file; and
atomically updating said first file by establishing said second inode as the inode for said first file, wherein said establishing comprises storing said second inode in a journal stored in a nonvolatile memory.

11. The method as recited in claim 10 further comprising writing a master inode corresponding to an inode file including said second inode to a checkpoint record in said journal.

12. The method as recited in claim 11 wherein recovering from a system failure comprises:
scanning said journal to locate a most recent checkpoint record and zero or more inodes subsequent to said most recent checkpoint record within said journal;
copying said master inode from said most recent checkpoint record to a volatile memory; and
updating an inode file corresponding to said master inode with said one or more inodes subsequent to said most recent checkpoint record.

13. The method as recited in claim 12 wherein said updating said inode file comprises:
copying one or more blocks of said inode file storing said one or more inodes to a copied one or more blocks; and
updating said master inode in said volatile memory to point to said copied one or more blocks.

14. The method as recited in claim 10 wherein said block map further comprises a first inode allocation bitmap indicating which inodes within said first inode file are allocated to files, the method further comprising:
copying said first inode allocation bitmap to a second inode allocation bitmap;
modifying said second inode allocation bitmap to reflect one or more inodes allocated to new files; and
establishing a third inode within said block map to said second inode allocation bitmap subsequent to said modifying said second inode bitmap.

15. The method as recited in claim 14 wherein said block map further comprises a first block allocation bitmap indicating which blocks within a storage including said block map are allocated to files, the method further comprising:
copying said first block allocation bitmap to a second block allocation bitmap;
modifying said second block allocation bitmap to reflect one or more blocks allocated to files; and
establishing a fourth inode within said block map to said second block allocation bitmap subsequent to said modifying said second block allocation bitmap.

16. The method as recited in claim 10 wherein said establishing said second inode is performed in response to a commit command.

17. The method as recited in claim 16 wherein said commit command is a close file command.

18. The method as recited in claim 16 wherein said commit command is an fsync command.

19. A storage including a non-volatile computer readable storage medium, the storage comprising:
a non-volatile memory storing a first inode locating a first version of a file in said storage and also storing a journal comprising a list of committed inodes; and
a block manager configured to copy said first inode to a second inode, wherein said block manager is configured to change said second inode in response to updates to the file, and wherein said block manager is configured to atomically update the file, producing a second version of the file, in response to a commit of the file by writing said second inode to said non-volatile memory, wherein said second inode locates said second version of said file in said storage, and wherein said block manager is configured to record said second inode in said journal.

20. The storage as recited in claim 19 wherein said commit of the file comprises a commit command received from an external source which updates the file.

21. The storage as recited in claim 20 wherein said commit command comprises a file close command.

22. The storage as recited in claim 20 wherein said commit command comprises an fsync command.

23. The storage as recited in claim 19 wherein said journal further includes a checkpoint record including a description of an inode file, a block allocation bitmap, and an inode allocation bitmap.

24. The storage as recited in claim 23 wherein the description comprises inodes for each of said inode file, said block allocation bitmap, and said inode allocation bitmap.

25. A method comprising:
copying a first inode to a second inode, wherein said first inode locates a first version of a file in a storage;
modifying said second inode in response to one or more changes to the file, creating a second version of the file; and
atomically updating the file to the second version by establishing said second inode as the inode for the file, wherein said establishing comprises storing said second inode in a journal stored in a nonvolatile memory.

26. The method as recited in claim 25 further comprising writing a master inode corresponding to an inode file including said second inode to a checkpoint record in said journal.

27. The method as recited in claim 26 wherein recovering from a system failure comprises:
scanning said journal to locate a most recent checkpoint record and zero or more inodes subsequent to said most recent checkpoint record within said journal;
copying said master inode from said most recent checkpoint record to a volatile memory; and
updating an inode file corresponding to said master inode with said one or more inodes subsequent to said most recent checkpoint record.

28. The method as recited in claim 27 wherein said updating said inode file comprises:
copying one or more blocks of said inode file storing said one or more inodes to a copied one or more blocks; and
updating said master inode in said volatile memory to point to said copied one or more blocks.

29. The method as recited in claim 25 wherein said block map further comprises a first inode allocation bitmap indicating which inodes within said first inode file are allocated to files, the method further comprising:
copying said first inode allocation bitmap to a second inode allocation bitmap;
modifying said second inode allocation bitmap to reflect one or more inodes allocated to new files; and
establishing a third inode within said block map to said second inode allocation bitmap subsequent to said modifying said second inode bitmap.

30. The method as recited in claim 29 wherein said block map further comprises a first block allocation bitmap indicating which blocks within a storage including said block map are allocated to files, the method further comprising:
  copying said first block allocation bitmap to a second block allocation bitmap;
  modifying said second block allocation bitmap to reflect one or more blocks allocated to files; and
  establishing a fourth inode within said block map to said second block allocation bitmap subsequent to said modifying said second block allocation bitmap.

31. The method as recited in claim 25 wherein said establishing said second inode is performed in response to a commit command.

* * * * *

UNITED STATES PATENT AND TRADEMARK OFFICE
CERTIFICATE OF CORRECTION

| | | |
|---|---|---|
| PATENT NO. | : 7,730,213 B2 | Page 1 of 1 |
| APPLICATION NO. | : 09/739618 | |
| DATED | : June 1, 2010 | |
| INVENTOR(S) | : John H. Howard | |

It is certified that error appears in the above-identified patent and that said Letters Patent is hereby corrected as shown below:

In column 3, line 12, before "performs" delete "the" and insert -- then --, therefor.

In column 10, line 30, delete "modes" and insert -- inodes --, therefor.

In column 14, line 13, in claim 1, delete "mode" and insert -- inode --, therefor.

In column 14, line 16, in claim 1, delete "mode" and insert -- inode --, therefor.

Signed and Sealed this
Second Day of August, 2011

David J. Kappos
*Director of the United States Patent and Trademark Office*